United States Patent
Damola et al.

(10) Patent No.: US 8,631,072 B2
(45) Date of Patent: Jan. 14, 2014

(54) METHOD FOR SELECTION OF SUITABLE PEERS IN A PEER-TO-PEER (P2P) NETWORK

(75) Inventors: Ayodele Damola, Solna (SE); Andreas Johnsson, Uppsala (SE); Johan Kolhi, Vaxholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 273 days.

(21) Appl. No.: 13/132,135

(22) PCT Filed: Dec. 3, 2008

(86) PCT No.: PCT/SE2008/051397
§ 371 (c)(1),
(2), (4) Date: Jun. 1, 2011

(87) PCT Pub. No.: WO2010/064965
PCT Pub. Date: Jun. 10, 2010

(65) Prior Publication Data
US 2011/0238756 A1  Sep. 29, 2011

(51) Int. Cl.
*G06F 15/16* (2006.01)
*G06F 12/00* (2006.01)

(52) U.S. Cl.
USPC .......................................... 709/204; 709/250

(58) Field of Classification Search
USPC .......... 709/203–205, 217–218, 223–229, 250
See application file for complete search history.

(56) References Cited

U.S. PATENT DOCUMENTS

| | | | | |
|---|---|---|---|---|
| 7,920,572 B2 * | 4/2011 | Bates et al. | ............... | 370/395.2 |
| 8,417,677 B2 * | 4/2013 | Nagoya et al. | ............... | 707/694 |
| 2004/0064568 A1 * | 4/2004 | Arora et al. | ................... | 709/228 |
| 2004/0064693 A1 * | 4/2004 | Pabla et al. | ................... | 713/168 |
| 2004/0181575 A1 * | 9/2004 | Mallberg et al. | ............. | 709/203 |
| 2005/0144288 A1 | 6/2005 | Liao | | |
| 2007/0064702 A1 | 3/2007 | Bates et al. | | |
| 2008/0235746 A1 | 9/2008 | Peters et al. | | |
| 2010/0138382 A1 * | 6/2010 | Nagoya et al. | ............... | 707/609 |

FOREIGN PATENT DOCUMENTS

| | | |
|---|---|---|
| EP | 1821487 A1 | 8/2007 |
| WO | 2004047408 A1 | 6/2004 |

OTHER PUBLICATIONS

Bindal, et al., "Improving Traffic Locality in BitTorrent via Biased Neighbor Selection", Proceedings of the 26th IEEE International Conference of Distributed Computing Systems (ICDCS'2006), Jul. 4, 2006, 9 pages, XP010927372.

Jia, et al., "Designs and Evaluation of a Tracker in P2P Networks", Eighth International Conference on Peer-to-Peer Computing (P2P'08), Sep. 8, 2008, pp. 227-230, XP031322344.

EP Search Report from corresponding application EP08878624.9-2413/2359564, dated Apr. 2, 2012, 5 pages.

(Continued)

*Primary Examiner* — Zarni Maung
(74) *Attorney, Agent, or Firm* — Rothwell, Figg, Ernst & Manbeck, P.C.

(57) ABSTRACT

The present invention relates to a method for selecting suitable peers CL1-CL5 in a peer to peer network for content downloading. The method comprises: Requesting addresses of peers possessing a specified content. Receiving to an operator node MON4, a reply comprising the requested addresses. Modifying 3 the reply, which modifying is based on operator preference available to the operator node. Sending the modified reply to a requesting client.

19 Claims, 6 Drawing Sheets

(56) References Cited

OTHER PUBLICATIONS

Pereira, R.L., et al., "On the Impact of P2P File Sharing Traffic Restrictions on User Perceived Performance", 2008 International Conference on Information Networking, ICOIN 2008, IEEE, 5 pages.

Office Action issued in corresponding Japanese application No. 2011-539470 on Mar. 12, 2013, 3 pages.

* cited by examiner

METHOD FOR SELECTION OF SUITABLE PEERS IN A PEER-TO-PEER (P2P) NETWORK

CROSS-REFERENCE TO RELATED APPLICATION

This application is a 35 U.S.C. §371 National Phase Entry Application from PCT/SE2008/051397, filed Dec. 3, 2008, and designating the United States.

TECHNICAL FIELD

The present invention relates to methods and arrangements for selecting suitable peers in a peer to peer network for content downloading.

BACKGROUND

The increased bandwidth introduced by the penetration of broadband and the availability of enhanced terminal capabilities, content creation and publishing tools has significantly increased in availability on the Internet of user generated content, e.g. YouTube, Podcasting, etc. Content aggregators such as Joost, BBC iPlayer are also becoming established sources of legal online content.

Peer-to-peer technology has shown itself as a viable technology for distributing user generated content and technology of choice of the content aggregators. For example, the iPlayer utilizes an IMP P2P client. Often referred to simply as peer-to-peer, or abbreviated P2P, peer-to-peer architecture is a type of network in which each workstation has equivalent capabilities and responsibilities. This differs from client/server architectures where some computers are dedicated to serving the others. The P2P network distributes the computing power between connected peers in the network and utilizes the aggregated resources, e.g. network available bandwidth, for efficient content distribution. P2P is often used as a term to describe one user linking with another user to transfer information and files through the use of a common P2P client to download material, such as software upgrades or media files.

When downloading content using P2P clients, pieces or chunks of the selected file are gathered from several nodes simultaneously in order to decrease download time and to increase robustness of the P2P network. The set of peers to download data chunks from has been selected by a so called Tracker which functions as a gateway between peers in the P2P network. It gathers information on which peers have what data chunks and spread that information to any requesting peer. The tracker can be located anywhere on the network.

A recent trend in the Internet is the use of P2P technology to build content distribution networks. Examples of commercial systems include Velocix from CacheLogic and Gridcasting from GridNetworks. Based on recent trends like those in the UK with BBC's IP player, an assumption is that P2P technology will be used by content providers in the near future as a cheap way to distribute content. At some point network operators themselves may turn to using P2P for content distribution, in particular video distribution. In any case the operators would first need to manage the P2P traffic in their networks. For traffic of over-the-top P2P applications, the operator would like to keep the peering traffic low as well as improving the end-user experience. This requires techniques and mechanisms that are operator specific to complement the already existing Internet-based methods.

In P2P systems based on Tracker architecture when a client requests content, it contacts the Tracker in order to obtain addresses of peers having the desired data chunks. The Tracker replies with a so called tracker response to the client which contains a list of addresses to peers having the data. For example, in the BitTorrent protocol the list of peers in the tracker response is by default 50, if the number of available peers is equal or above 50. If there are more peers that have the desired chunk of content, the tracker randomly selects peers to include in the response, or the tracker may choose to implement a more intelligent mechanism for peer selection when responding to a request. This selection can for example be made based on locality, network measurements and similar. All based on the viewpoint of the Tracker.

The problem is that much locality information and other operator specific information is not usually available to a central Internet based Tracker. Further, the Tracker may not always take the operator needs into account—such as keeping traffic local to the operator at hand. The same type of problem appears if the P2P system is based on Distributed Hash Table DHT-like algorithms.

SUMMARY

The present invention relates to problems of managing P2P traffic. The invention focuses on improving the way of selecting peers to download content by utilizing the operator's information about the distribution network. Further more, a method is proposed which enables an operator provided a premium P2P service. The premium service enables end users to access content using P2P over a prioritized connection in a managed network which is offered by the operator as an extra service.

The problem of managing P2P traffic is solved by a method for selecting suitable peers for content downloading. The method comprises:

Requesting addresses of peers possessing a specified content.

A reply comprising the requested addresses is received to an operator node.

The reply is modified in the node wherein the modification is based on operator preference available to the operator node.

The modified reply is forwarded to a requesting client.

The invention describes mechanisms and techniques for selecting the peers to download content based on operator preference. Basically, the method involves modification of for example a tracker response (also called Reply), based on operator specific information, or in the case of for example a DHT-like P2P system it can block or modify responses from other peers based on the operator specific information. According to one exemplary embodiment a P2P tracker is used as search mechanism to find peers possessing required content. A reply from the tracker is modified in the operator node before it is forwarded to a requesting client. Connections are established by the requesting client to clients found in the modified reply.

According to another exemplary embodiment an unstructured P2P system is used as search mechanism to find peers possessing required content. Responses from the peers are either let through to a requesting client or blocked. Addresses of peers not fulfilling operator preference are blocked and may be cached for later usage. In this embodiment the requesting client is unable to establish connections to clients that were let through and a further request is sent to find peers possessing required content.

Yet another embodiment represents a method for selecting suitable peers when the modification utilizes additional addresses to peers from a selection of "premium nodes".

The invention makes it possible to modify a reply in order to make the client to download content based on e.g. locality. This has the potential to improve the end-user experience while at the same time it can reduce the peering traffic. This gives the following advantages:

Faster download since the participating peers are closer.
Reduced traffic in-between operators which reduce the peering costs.
Backward compatibility with peers not using the operator's P2P tracker-response modifying mechanism.
A P2P monitor node opens up for legal intercept of traffic.
Gives an operator the possibility to provide a premium P2P network to its customers; hence a new avenue for revenue.

The invention will now be described more in detail with the aid of preferred embodiments in connection with the enclosed drawings.

DETAILED DESCRIPTION

Figure 1:
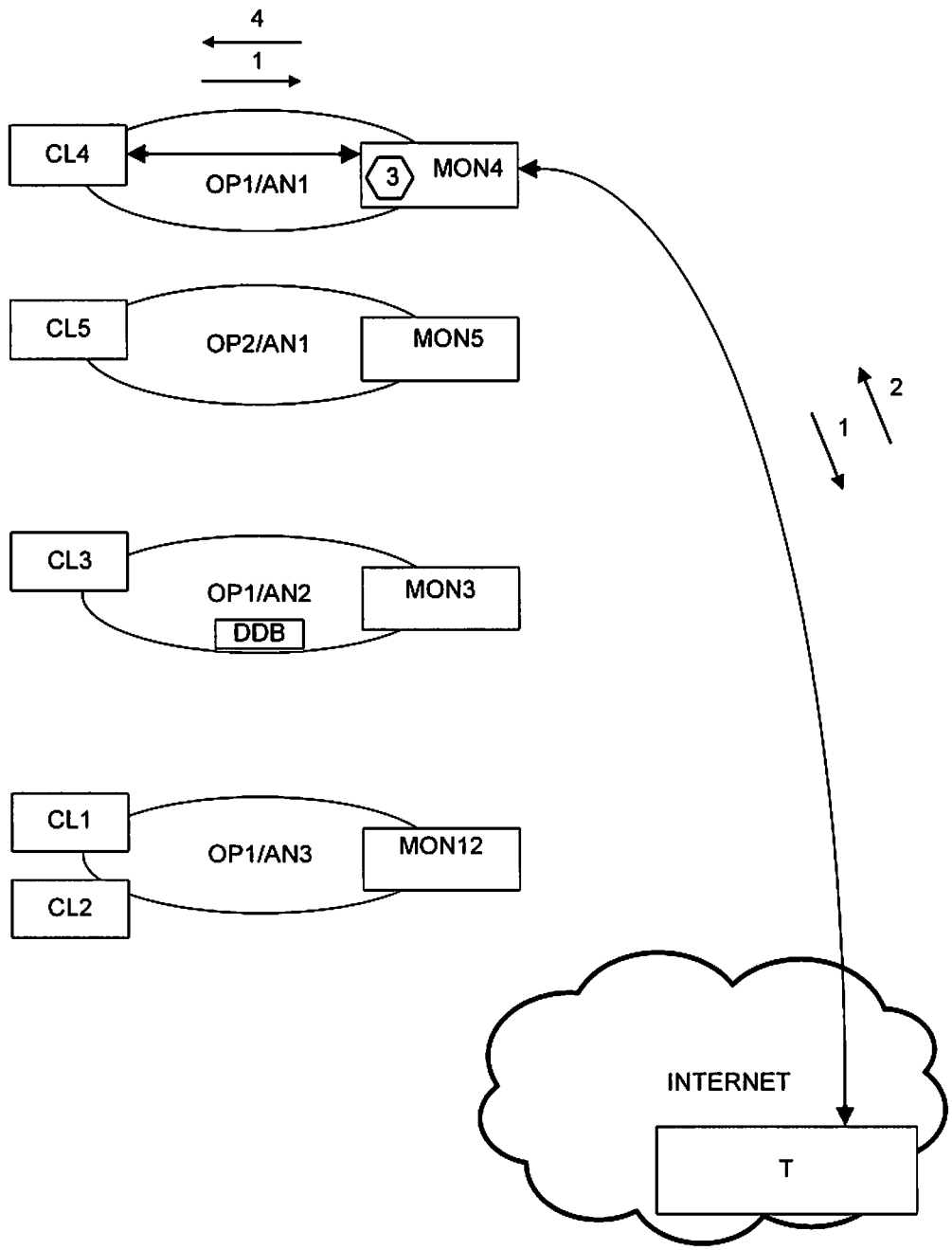
FIG. 1 is a block schematic illustration disclosing a plurality of clients connected via various access networks to internet. A central P2P Tracker is located in the internet. Clients may communicate with the tracker via a monitoring node.

FIG. 1 discloses according to an exemplary embodiment, a peer to peer P2P network that includes plural clients CL1-CL5 connected via various access networks AN1-AN3 to INTERNET. The figure discloses a very simplified example and the number of clients are in the reality much higher. The clients CL1-CL5 may be, for example, a mobile phone, a computer, a set top box, or other devices that are capable of exchanging information with the internet. The access networks AN1-AN3 may be, for example, a communication network, a phone network, an internet service provider, etc. In this embodiment a first operator OP1 is accessible in AN1-AN3 and a second operator OP2 is accessible in access network AN1. CL1 and CL2 are both attached to OP1/AN3, CL3 is attached to OP1/AN2, CL5 to OP2/AN1 and CL4 is attached to OP1/AN1. An operator node MON4 also called operator P2P Monitor is located in the AN1 and is part of OP1. A P2P Monitor MON5 is located in AN1 and is part of OP2, MON3 is located in AN2 and is part of OP1 and MON12 is located in AN3 and is part of OP1. A central tracker T is located within the Internet. The tracker functions as a directory service for the clients, also called peers, in the P2P network. A P2P tracker may be any P2P searching mechanism (e.g. the BitTorrent tracker system). The tracker gathers information on which peers have what data chunks and spread information to any requesting peer. In FIG. 1 a distributed database DDB can be seen. The DDB functions as a decentralized tracker. This will be further explained when a first embodiment is discussed. In this first embodiment that will be explained more in detail in FIG. 2 a method for selecting suitable peers for content downloading will be shown. The central tracker T hereby receives a request 1 for addresses of peers possessing a specified content. The tracker response 2 is captured by the P2P monitor MON4. According to the invention, the response is modified based on operator preferences available in MON4. The modifying is shown in FIG. 1 with a hexagon symbol 3. The modified response is sent to a requesting client CL4.

Figure 2:
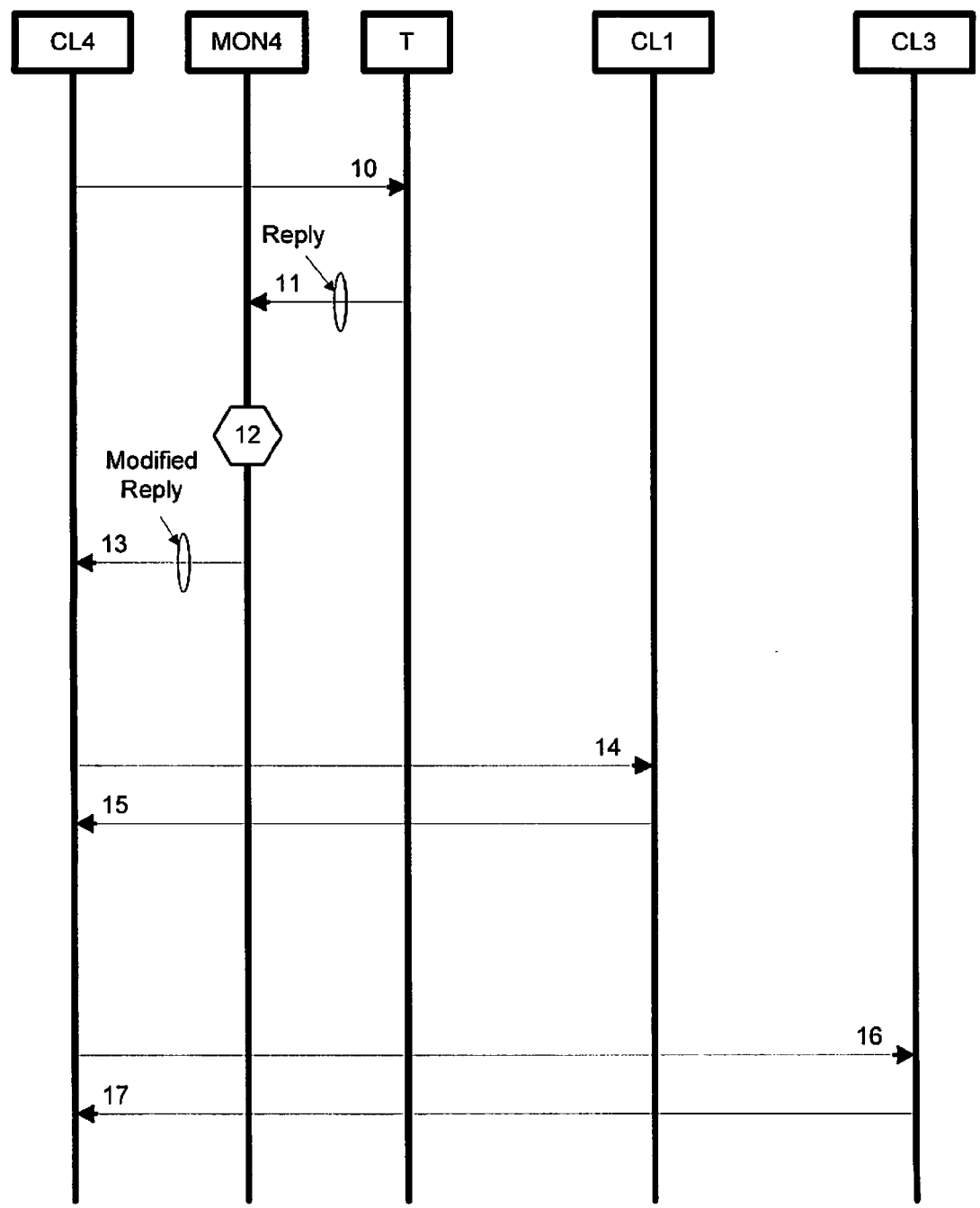
FIG. 2 discloses a signal sequence diagram that represents a method for selecting suitable peers when a P2P tracker is used as search mechanism.

A method according to the first embodiment of the invention will now be explained more in detail together with FIG. 2. FIG. 2 is a signal sequence diagram wherein the signalling points CL4, MON4, T, CL1 and CL3 that were briefly explained earlier together with FIG. 1 have been disclosed. A prerequisite for the method is that a requesting client by some means know the address of a tracker which has information about which peers that possess the desired content for example by downloading a torrent file such as BitTorrent, well known by a person skilled in the art. The method comprises the following steps:

A request for data chunks of a file that is specified in the request is sent 10 from the client CL4 to the central tracker T i.e. a search request is sent by the client CL4 to the P2P tracker for searching the desired content of the P2P network.

The tracker T gathers information on which peers have the requested data chunks. In this example IP address information is gathered in a list by the tracker.

The tracker responds with the list of peers having the data chunks of the requested file. In this simplified example the list comprises IP addresses of CL1, CL3 and CL5 (see also FIG. 1). The response is sent 11 from the P2P tracker T via the P2P monitor MON 4 towards the requesting client CL4. The response is in this embodiment also called a Reply, see FIG. 2.

According to the invention, the P2P monitor MON4 prevents the tracker response from reaching CL4 by capturing the response.

MON4 modifies the captured tracker response based on e.g. locality, network topology and network measurement. The modifying will be further explained later in the description when the P2P monitor is discussed in connection with FIG. 4. In this embodiment the operator policy requires that communication is hindered between peers located in different operator networks. The operator preference results in removal of the peer/client CL5 from the response since CL5 is located in OP2 while the requesting client CL4 is located in OP1. The modified response hereby comprises a list of IP addresses for CL1 and CL3. The modification is disclosed in FIG. 2 with a hexagon symbol 12. The modified response is in this embodiment also called a Modified Reply, see FIG. 2.

The IP address for CL5 that was removed from the response is stored in the P2P monitor MON4 for potential later usage.

The modified tracker response is sent 13 from MON4 to the requesting client CL4.

The requesting client CL4 queries 14 CL1, found in the modified response, for retrieving 15 the data chunks.

The requesting client CL4 queries 16 CL3, found in the modified response, for retrieving 17 the data chunks.

The request for data chunks that was sent 10 from the client CL4 to the central tracker T may be intercepted by MON4 for later usage in case other clients in OP1/AN1 requires the same data chunks and if the chunks already have been stored in the P2P monitor.

If the client was unable to establish a connection to peers from the list in the modified response for example if the peer has left the P2P network, or if the aggregated download speed from the selected peers is too low the requesting client could request another set of peers from the P2P tracker T. This request can also be intercepted by MON5. The set of peers may be reassembled using the cached/stored addresses, i.e. in this example the address for CL5, together with the modification operator policy. If there is not enough cached peer addresses, the request is forwarded to the tracker and the before described sequence is repeated. This will be explained more in detail in a second embodiment. To prevent the requesting client from "starving", the operator policy may hereby be less particular.

Instead of using a tracker as search mechanism, a Distributed Hash Table may be used. One of the central parts of a P2P system is a directory service. Basically the directory service is a database which contains IP addresses of peers that have a specific content. In a centralized P2P implementation this directory is called tracker (as discussed above), in a distributed P2P implementation it is called Distributed Hash Table DHT. In DHT a plurality of distributed databases DDB resides on many peers rather than in a single node like in the tracker case; hence it is a distributed database DDB. The DHT algorithm is well known by persons skilled in the art. In this variation of the first embodiment instead of sending the request from the requesting client to the tracker, the request is forwarded to the most appropriate peer in accordance to the DHT implementation which is known to a person skilled in the art. So, instead of the tracker responding back with the list of IP addresses of peers with the desired content, the found peer possessing the IP addresses will respond back and deliver the list. The method of operation in the P2P Mon node is similar compared to the P2P tracker case.

While in the first embodiment the tracker or alternatively the DHT algorithm gathers information on which peers have what data chunks and spread information to a requesting peer, instead another way of searching may be done. This will now be described in a second embodiment. Not all P2P networks are based on DHT or on a central tracker that has information on which chunks of data are located where. Another P2P search solution is to use a so called unstructured P2P system UPS for searching content. The unstructured P2P system is well known by persons skilled in the art. When using UPS the requests for data chunks do not have to pass a central database, instead it is sent directly to the responsible peers. The peers that have the content would respond according to the UPS-like P2P implementation and answer directly to the requesting peer. The method of operation in the P2P Mon node is similar compared to the P2P tracker case; however there are some minor differences as described below.

Figure 3:
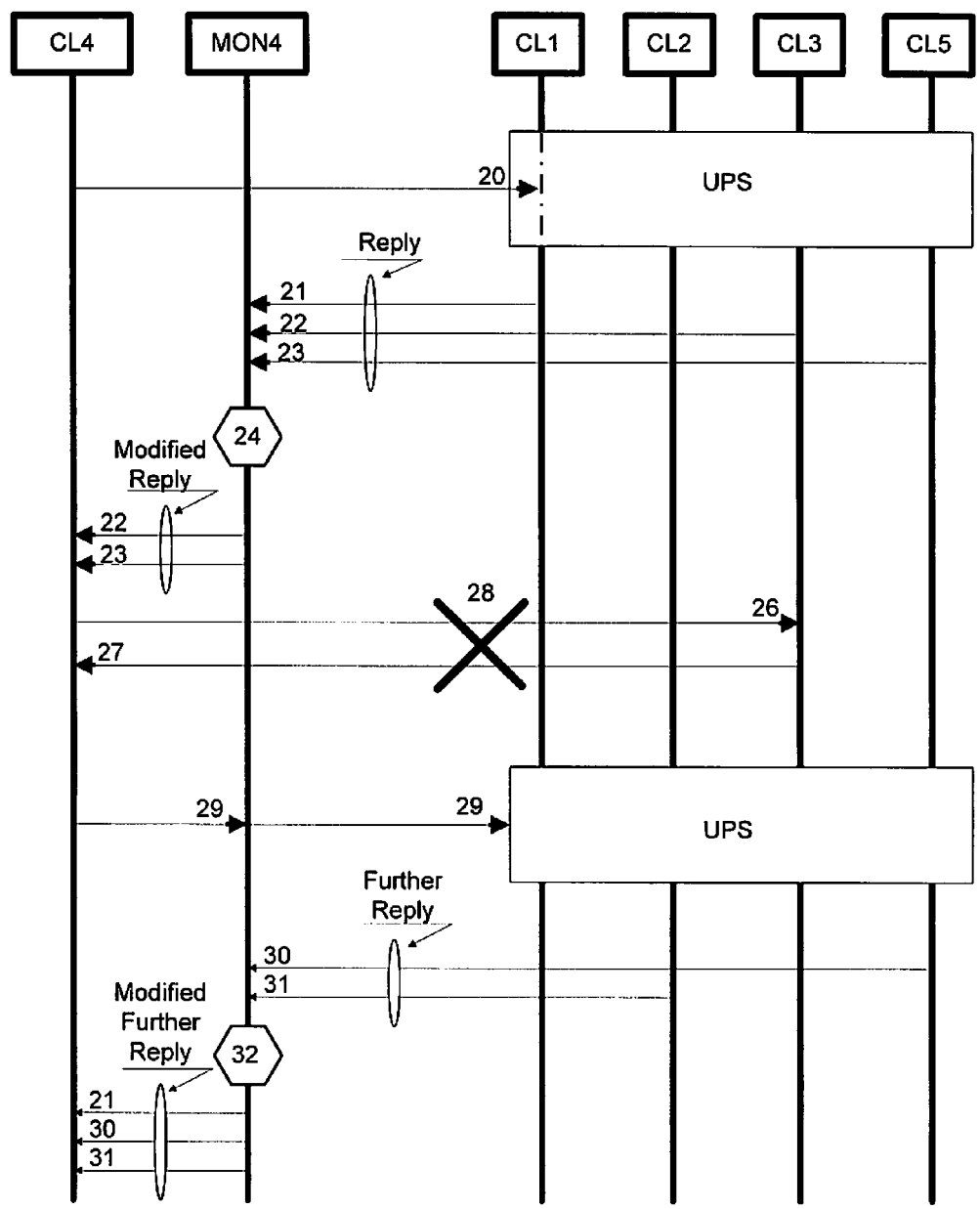
FIG. 3 discloses a signal sequence diagram that represents a method for selecting suitable peers when an unstructured P2P system is used as search mechanism.

FIG. 3 discloses the second embodiment of the invention wherein the search is done by the unstructured P2P system UPS. In FIG. 3 the same network configuration applies as was previously shown in FIG. 1, except that the tracker T has been excluded. Instead of using the central tracker for the search for content, in FIG. 3 UPS is used. In the figure, search according to the unstructured P2P system is schematically represented with a block symbol UPS. The method according to the second embodiment of the invention comprises the following steps:

A request for data chunks of a file that is specified in the request is in this example sent 20 from the client CL4 to client CL1.

A search for clients possessing the required content starts. The search is performed by forwarding the received request from CL1 to neighbouring peers in the network that in turn will forward the request to other peers until all peers in the P2P network has received the request. Exactly how the search is done is a matter of implementation.

Clients possessing the required content, i.e. requested data chunks, answer directly to the requesting client CL4. In this simplified example the clients CL1, CL3 and CL5 send, one by one, their IP address to CL4. The responses 21-23 are sent via the P2P monitor MON 4 towards the requesting client CL4. The responses 21-23 received by MON4, together constitutes a so called Reply, see FIG. 3.

According to the invention, the P2P monitor MON4 prevents the responses 21-23 from reaching CL4 by capturing them.

MON4 modifies the Reply by either blocking responses which comes from undesirable peers according to operator policy or by letting desirable responses through to CL4. In this embodiment the operator policy requires that if content is located in several access networks within an operator network, measurement tools can be utilized to predict which peers in which access networks to let through to the requesting client. In this example the operator preference results in blocking of the response 21 sent from client CL1 while the responses 22 and 23 sent from clients CL3 and CL5 are let through to CL4. The blocked response from CL1 is cached for potential later usage. The responses 22 and 23 sent out one by one from MON4, together constitutes a so called Modified Reply, see FIG. 3. The modification of the Reply, i.e. the removal of 21 from the Reply, is disclosed in FIG. 3 with a hexagon symbol 24.

The requesting client CL4 queries 26 CL3 for retrieving 27 the data chunks. However, in this example the requesting client CL4 was unable to establish a connection to CL3. This is shown in FIG. 3 with a cross-over symbol 28.

Since the requesting client was unable to establish a connection to CL3, client CL4 will make a new search request 29 which will be captured by MON4.

Since MON 4 has previously cached the response 21 from CL1 it can forward it back to CL4. Else, the search request 29 from CL4 will be forwarded for a new search into UPS.

In this example the search request is forwarded. Clients possessing the required content answer directly to the requesting client CL4. In this example the clients CL2 and CL5 send, one by one, their IP address to CL4. Responses received by MON4, together constitutes a so called Further Reply, see FIG. 3. The Further Reply comprises responses 30, 31 from the peers CL2 and CL5 and is sent via the P2P monitor MON 4 towards the requesting client CL4.

The P2P monitor MON4 prevents the responses in the Further Reply from reaching CL4 by capturing them.

MON4 modifies the Further Reply. This time the P2P monitor is less aggressive in its selection. The operator preference results in no removal of responses. Moreover, the previous cached response 21 is inserted in a Modified Further Reply, see FIG. 3. The Modified Further Reply hereby comprises the responses 21,30,31 from the clients CL1, CL2 and CL5 and is sent from MON4 to CL4. The modification of the further reply is disclosed in FIG. 3 with a hexagon symbol 32.

Figure 4:
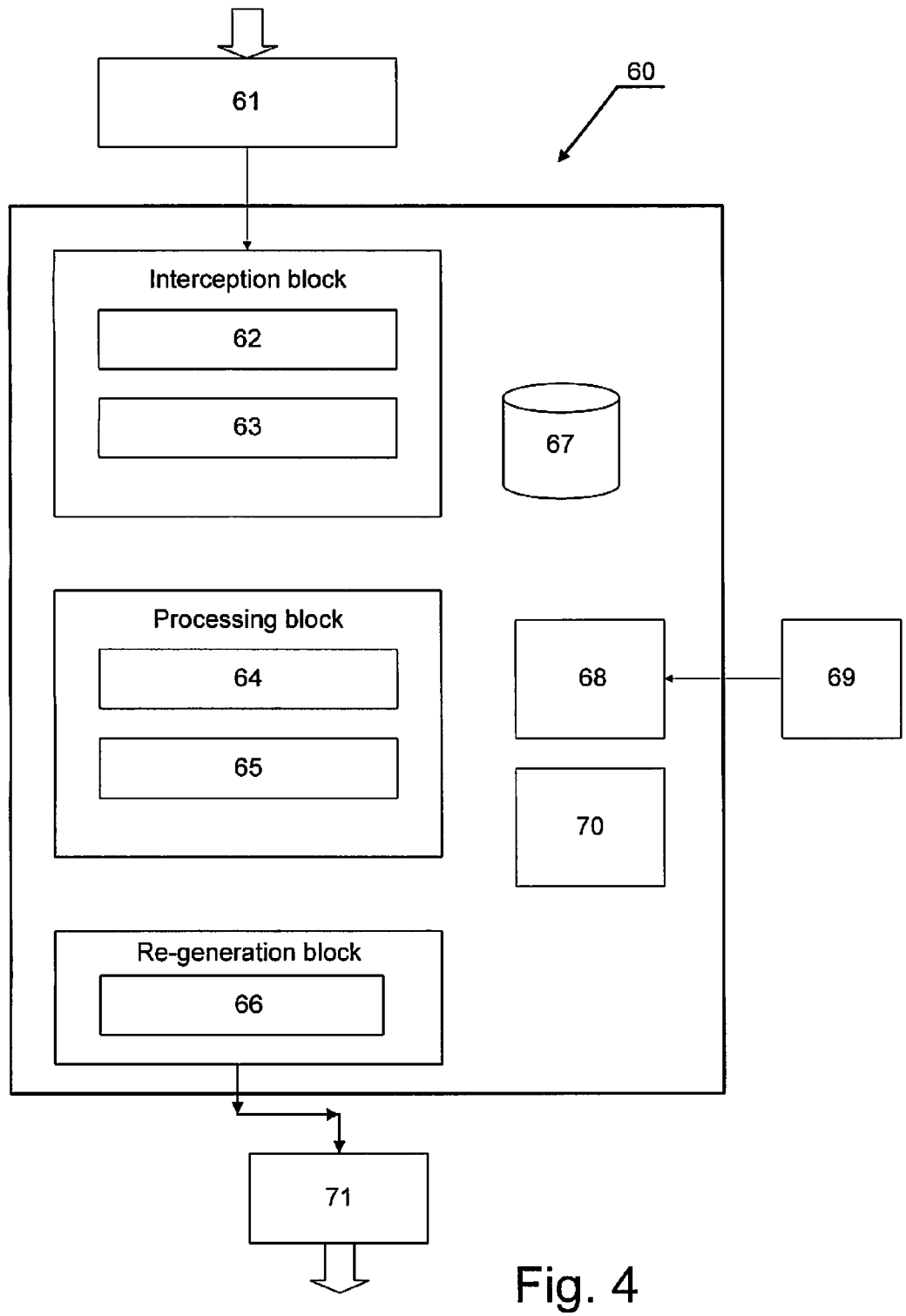
FIG. 4 discloses a block schematic illustration of a P2P monitoring node.

FIG. 4 discloses more in detail the peer to peer monitor P2P Mon 60 that has been discussed earlier in the application together with the FIGS. 1-3. In the previous figures the P2P Mon 30 was represented by for example MON4.

The requirements on the P2P Mon are as follows:

The location of the P2P monitor node can vary but it should be able to capturing traffic flowing between the client peer, the tracker (if such a node exists) as well as other peers.

It should be Deep Packet Inspection enabled in order to identify P2P traffic such as requests and responses between peers and trackers. Deep Packet Inspection is a form of computer network packet filtering that examines the data and/or header part of a packet as it passes an inspection point, searching for non-protocol compliance, viruses, spam, intrusions or predefined criteria to decide if the packet can pass or if it needs to be routed to a different destination, or for the purpose of collecting statistical information. This is in contrast to shallow packet inspection (usually called just packet inspection), which just checks the header portion of a packet.

It must be aware of in which access network a specific peer/IP address is located.

The P2P Mon may be enabled with network performance measurement tools, such as for example BART. Aspects of BART has been published at several conferences such as:

S. Ekelin and M. Nilsson, "Continuous monitoring of available bandwidth over a network path", $2^{nd}$ Swedish National Computer Networking Workshop, Karlstad, Sweden, Nov. 23-24, 2004.

S. Ekelin, M. Nilsson, E. Hartikainen, A. Johnsson, J.-E. Mångs, B. Melander and M. Björkman, "Real-time measurement of end-to-end available bandwidth using Kalman filtering," in *Proc. 10th IEEE/IFIP Network Operations and Management Symposium*, 2006.

E. Hartikainen and S. Ekelin, "Tuning the Temporal Characteristics of a Kalman-Filter Method for End-to-End Bandwidth Estimation," in *Proc. 4th IEEE/IFIP Workshop on End-to-End Monitoring Techniques and Services*, 2006.

E. Hartikainen and S. Ekelin, "Enhanced Network-State Estimation using Change Detection," in *Proc. 1st IEEE LCN Workshop on Network Measurements*, 2006.

It should be able to receive an operator policy on how and on what grounds to modify tracker responses or responses from other peers.

This section describes the actual anatomy of the P2P monitor node—or the functionality of the P2P modifier which can be co-located with other functionality in one common physical node. As can be seen in FIG. 4, the P2P monitor 60 comprises three main blocks i.e. an interception block, a processing block and a re-generation block. A response from a tracker or from a peer is received to a receiver 61 and forwarded to the interception block.

The interception block is responsible for extracting/capturing the response message from the tracker or other peers. This is done by implementing deep packet inspection DPI. A DPI module 62 is disclosed within the interception block. Optionally decryption could be applied to the traffic from the tracker. Once the response is extracted from the traffic, it's parsed making it possible for other modules to further process the data. A parsing module 63 is disclosed in the figure within the interception block. The parsing must be done in accordance to the P2P system in question, hence the parsing pattern of for example the different flavors of Bittorent protocol would be different from each other. The details of how to handle different P2P protocol implementations are stored in a database 67 of P2P protocol patterns.

The processing block is responsible for the ordering of a list of seeds or peers holding content in accordance to the operator policy. Depending on implementation, it could perform; ordering of the existing seed list, removing some addresses of seeds, or even adding totally new address of content seeds. A filtering module 64 and an insertion module 65 can be seen in FIG. 3 within the processing block. In the case where addresses were removed, a memory module 70 would store the removed addresses. A removed address may be used in case the requesting client is not able to successfully obtain content from the modified list of seeds. To prevent the requesting client from 'content starvation' the addresses of removed seeds can be provided when the client makes a re-request for content seeds. It should be obvious that the processing block also can modify or drop replies from other peers if the P2P system is based on a Distributed Hash Table DHT search system instead of a centralized tracker, or an unstructured P2P system as has been seen in FIG. 3 when the second embodiment was described.

The re-generation block is responsible for reassembling the tracker response which by this point has the seed addresses in accordance to the operator's policy. A repackaging module 66 is disclosed in FIG. 4 within the re-generation module. Encryption is optional and is done if the initial tracker response was encrypted. A modified response can be forwarded from P2P Mon 60 to a requesting peer via a sender 71.

An operator policy holder 69 is connected to an operator policy interface 68. Different modification policies can be held by the policy holder 69. Examples on modification policies are:

Hinder communication between peers located in different operator networks by removing addresses from Tracker responses or drop replies from UPS-like P2P nodes. This will reduce the traffic in-between operators and thus reduce peering costs.

If content is located in several access networks within an operator network the P2P Mon can utilize measurement tools (e.g. for estimating RTT or available bandwidth) to predict which peers in which access network to let through in a Tracker response or which replies from UPS-like P2P nodes to forward.

The P2P Mon can also provide additional addresses to peers from a selection of "premium nodes" or from a "premium network" with e.g. higher capacity or a broader (and legal) selection of content. Such addresses should only be accessible from paying P2P customers. This requires tollgate functionality in the P2P Mon as well as tagging of packets for higher priority in the network.

Figure 5:
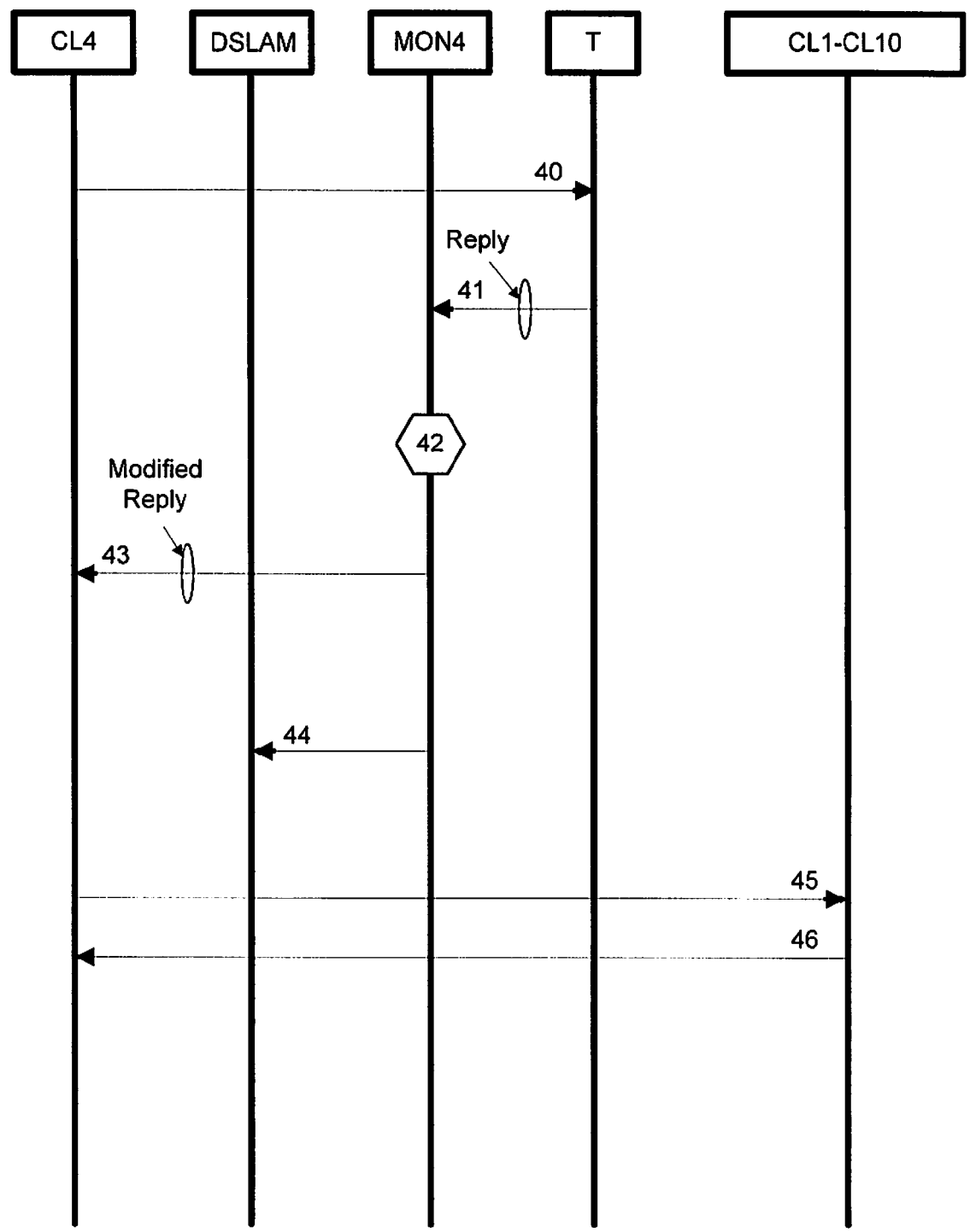
FIG. 5 discloses a signal sequence diagram that represents a method for selecting suitable peers when a P2P tracker is used as search mechanism and when a modification utilizes additional addresses to peers from a selection of "premium nodes".

In order to prioritize and handle P2P traffic in the access network, an additional distributed P2P tagging function can be implemented. This tagging function is under control by the P2P Mon and can be used to mark certain traffic differently in order to give it correct prioritization through the access network. This could either be by marking P2P premium subscribers' traffic with specific 802.1p-bits for Ethernet priority. It can also mean that the P2P tagging function can put special VLAN-tags on the traffic in order to direct it to another network. By marking the traffic with specific 802.1p-bits, the whole access network can queue the traffic according to policies, all the way from the access node, through the whole network. Since the 802.1p-bit marking takes place in operator equipment, this marking can of course be translated into DCSP bits if needed. Other translation schemes (MPLS LSPs and others) are possible too. The P2P Tagging function should be seen as a broken out function from the P2P Mon itself. The tagging function does not contain any complex mechanisms, it is meant to be a light weight function that should be easy to implement. By combining the P2P Mon, the P2P tagging function and connections to a subscriber database, very advanced services and new revenue streams can be envisioned. Premium content can be a subscriber only service and content service providers can get paid for premium content. This also opens up for the ideas that STIM (Svenska Tonsättares Internationella Musikbyrå) proposed—a legal, voluntary filesharing tax that should be connected to broadband services. The P2P Mon and premium network connections could be one way of solving the technical issues that still remained unsolved when the file sharing tax idea was proposed. FIG. 5 discloses a signal sequence diagram according to a third embodiment of the invention that represents a method for selecting suitable peers when the modification utilizes additional addresses to peers from a selection of "premium nodes". Beyond entities disclosed and explained in the earlier embodiments, FIG. 5 discloses an access node DSLAM that is responsible for tagging selected traffic. In FIG. 5 clients in the P2P network are represented with the reference signs CL1-CL10. The method according to the third embodiment comprises the following steps:

Like in the first embodiment the requesting client CL4 requests for data chunks by sending a request 40 to the central tracker T.

The tracker T gathers information on which peers have the requested data chunks.

The tracker responds with the list of peers having the data chunks of the requested file. The list comprises IP addresses of CL1-CL5. The response (or Reply) is sent 41 from the P2P tracker T via the P2P monitor MON 4 towards the requesting client CL4.

The P2P monitor MON4 prevents the tracker response from reaching CL4 by capturing the response.

MON4 modifies the captured tracker response based on operator policy. However in this exemplified embodiment the requesting client is a prioritized client and a premium IP address for CL10 is added to the modified reply. The modified reply hereby comprises a list of IP addresses for CL1-CL5 and for CL10. The modification is disclosed in FIG. 5 with a hexagon symbol 42.

The modified tracker response is sent 43 from MON4 to the requesting client CL4.

A tagging instruction is in this embodiment sent 44 from MON4 to DSLAM. This instructs the DSLAM to tag requests from CL4 if access to CIAO is required.

The requesting client CL4 is now able to query 45 CL10, found in the modified response, for retrieving 46 the data chunks. To be noted is that without the tagging CL4 would have had no access right to content from CL10.

Figure 6:
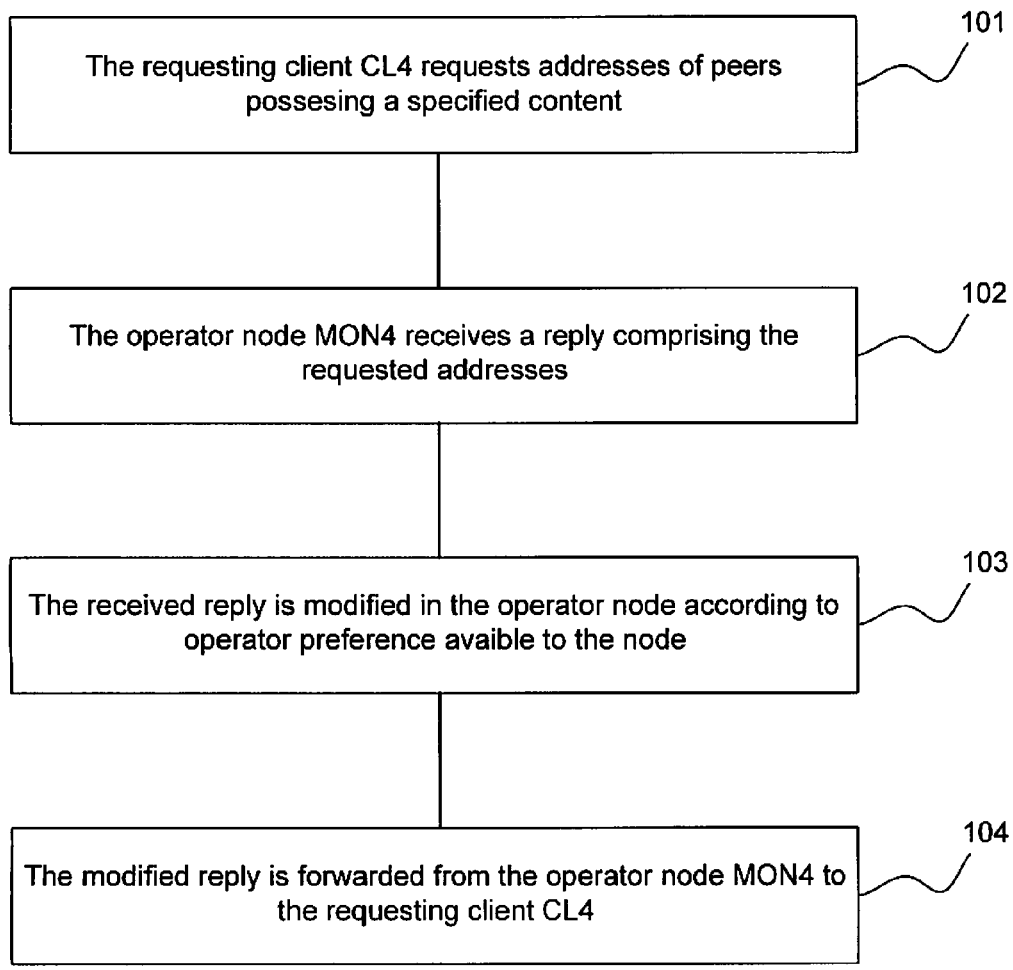
FIG. 6 discloses a flow chart illustrating some essential method steps of the invention.

FIG. 6 discloses a flow chart illustrating some essential method steps of the invention. The flow chart is to be read together with the earlier shown figures. The flow chart comprises the following steps:

The requesting client CL4 requests addresses of peers possessing data chunks of a file that is specified in the request by sending a search request for searching the desired content of the P2P network. This step is shown in FIG. 6 with a block 101.

The operator node MON4 receives a reply that comprises addresses of peers possessing the desired data chunks. This step is shown in FIG. 6 with a block 102.

The operator node MON4 modifies the received reply based on operator preference such as e.g. locality, network topology and network measurement. This step is shown in FIG. 6 with a block 103.

The modified reply is forwarded to the requesting client CL4. This step is shown in FIG. 6 with a block 104.

A system that can be used to put the invention into practice is schematically shown in the FIG. 1 and FIG. 4. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method for selecting suitable peers in a peer to peer network for content downloading, the method comprising:
receiving at an operator node, a reply to a request, which request was transmitted by a client, for addresses of peers possessing at least a portion of specified content, the reply comprising a set of one or more peer addresses, wherein each peer address included in the set is an address of a peer that possesses at least a portion of the specified content;
modifying the reply based on operator preference information available to the operator node; and
sending the modified reply to the client.

2. The method of claim 1, wherein a central tracker (T) receives the request for addresses and the reply is sent from the central tracker (T) to the operator node.

3. The method of claim 1, wherein a distributed database (DDB) receives the request for addresses and the reply is sent from the distributed database (DDB) to the operator node.

4. The method of claim 1, wherein an unstructured P2P system is used for searching for the specified content and the reply is sent from peers in the peer to peer network to the operator node.

5. The method of claim 1, wherein the modified reply includes some but not all of the addresses included in the reply and the addresses included in the reply but not included in the modified reply are cached for later usage.

6. The method of claim 5, further comprising transmitting to the client a message containing one of the cached addresses.

7. The method of claim 5, further comprising receiving a second reply to a second request transmitted by the client, modifying the second reply to create a modified second reply, and transmitting to the client the modified second reply, wherein the second reply comprises a second set of one or more peer addresses and the modified second reply comprises a subset of the second set of one or more peer addresses and/or one of the cached addresses.

8. The method of claim 7, wherein the modified second reply comprises one of the cached addresses.

9. The method of claim 1, further comprising receiving at the operator node the request transmitted by the client.

10. The method of claim 1, wherein the modifying step comprises identifying a peer addresses included in the set of peer addresses that is an addresses of a peer located in different operator network than the operator network in which the operator node is located and not including the identified peer address in the modified reply.

11. The method of claim 1, which modification utilizes measurement tools if peers are located in several access networks within an operator network.

12. The method of claim 1, which modification utilizes additional addresses to peers from a selection of premium nodes.

13. The method of claim 1, wherein certain traffic received from the peer to peer network to the operator node marked in order to give it a correct prioritization in a traffic receiving access network.

14. A node for selecting suitable peers in a peer to peer network for content downloading, the node comprising:
  a receiver to receive a reply comprising addresses of peers holding at least a portion of a requested content, wherein the reply is transmitted in response to a request transmitted by a client;
  a processor to modify the reply, which modifying is based on operator preference available to the node; and
  a transmitter to send the modified reply to the client.

15. The node of claim 14, the node further comprising interception and/or capturing means to monitor requests.

16. The node of claim 14, which node is enabled with network performance tools.

17. The node of claim 14, which node is enabled with deep packet inspection tools used to extract a received reply message.

18. The node of claim 14, which node utilizes an additional distributed tagging function used to mark certain traffic in order to give it correct prioritization through a traffic receiving access network.

19. Article of manufacture comprising a program storage device having a computer readable code embodied therein to select suitable peers in a peer to peer network for content downloading, which computer readable program code comprises:
  computer readable program code for receiving a reply comprising a set of one or more requested addresses, wherein the reply is transmitted in response to a request for peer addresses transmitted by client;
  computer readable program code for modifying the reply based on available operator preference information; and
  computer readable program code for sending the modified reply to the client.

* * * * *

UNITED STATES PATENT AND TRADEMARK OFFICE
CERTIFICATE OF CORRECTION

| | | |
|---|---|---|
| PATENT NO. | : 8,631,072 B2 | Page 1 of 1 |
| APPLICATION NO. | : 13/132135 | |
| DATED | : January 14, 2014 | |
| INVENTOR(S) | : Damola et al. | |

It is certified that error appears in the above-identified patent and that said Letters Patent is hereby corrected as shown below:

On the title page, item (75), under "Inventors", in Column 1, Line 2,
delete "Johan Kolhi," and insert -- Johan Kölhi, --, therefor.

In the Specification

In Column 7, Lines 3-4, delete "P2P Mon 30" and insert -- P2P Mon 60 --, therefor.

In Column 9, Line 51, delete "CIAO" and insert -- CL10 --, therefor.

In the Claims

In Column 11, Line 34, in Claim 13, delete "node marked" and insert -- node is marked --, therefor.

In Column 12, Line 22, in Claim 19, delete "Article" and insert -- An article --, therefor.

Signed and Sealed this
Eighth Day of July, 2014

Michelle K. Lee
*Deputy Director of the United States Patent and Trademark Office*